(12) United States Patent
Zhang et al.

(10) Patent No.: US 12,090,683 B2
(45) Date of Patent: Sep. 17, 2024

(54) COMPOSITE TRANSPARENT FILM, PREPARATION METHOD THEREOF, AND METHOD FOR CONTINUOUS DIGITAL LIGHT PROCESSING CERAMIC 3D PRINTING BASED ON THE SAME

(71) Applicant: QINGDAO UNIVERSITY OF TECHNOLOGY, Shandong (CN)

(72) Inventors: Guangming Zhang, Shandong (CN); Jin Jiang, Shandong (CN); Hongbo Lan, Shandong (CN); Fei Wang, Shandong (CN); Daosen Song, Shandong (CN); Hui Huang, Shandong (CN); Wenhai Li, Shandong (CN); Zun Yu, Shandong (CN)

(73) Assignee: QINGDAO UNIVERSITY OF TECHNOLOGY, Qingdao (CN)

(*) Notice: Subject to any disclaimer, the term of this patent is extended or adjusted under 35 U.S.C. 154(b) by 390 days.

(21) Appl. No.: 17/568,098

(22) Filed: Jan. 4, 2022

(65) Prior Publication Data
US 2022/0212362 A1    Jul. 7, 2022

(30) Foreign Application Priority Data
Jan. 5, 2021    (CN) .......................... 202110011236.5

(51) Int. Cl.
*B33Y 10/00* (2015.01)
*B28B 1/00* (2006.01)
*B28B 13/02* (2006.01)
*B33Y 40/10* (2020.01)
*B33Y 70/10* (2020.01)

(52) U.S. Cl.
CPC .............. *B28B 1/001* (2013.01); *B28B 1/008* (2013.01); *B28B 13/0275* (2013.01); *B33Y 10/00* (2014.12); *B33Y 40/10* (2020.01); *B33Y 70/10* (2020.01)

(58) Field of Classification Search
None
See application file for complete search history.

(56) References Cited

U.S. PATENT DOCUMENTS

2022/0339827 A1*  10/2022  Zhu ...................... B33Y 10/00

FOREIGN PATENT DOCUMENTS

| CN | 102649882 A | * | 8/2012 |
| CN | 107674457 A | * | 2/2018 |

* cited by examiner

*Primary Examiner* — Mohammad M Ameen
(74) *Attorney, Agent, or Firm* — Shih IP Law Group, PLLC

(57) ABSTRACT

A composite transparent film, a preparation method thereof and a method for continuous digital light processing ceramic 3D printing based on the same are provided. The method selects a mixture of silica microspheres and PDMS to form a composite film on which silica is used to form a hydrophobic layer. Combined with specific optimized parameters, the film is more suitable for continuous digital light processing ceramic 3D printing, which can realize the continuous printing of ceramic slurries, solve the problem of delamination of printed pieces obtained by the existing 3D printing method of ceramics, improve the printing accuracy, and decrease the printing costs.

8 Claims, 2 Drawing Sheets

COMPOSITE TRANSPARENT FILM, PREPARATION METHOD THEREOF, AND METHOD FOR CONTINUOUS DIGITAL LIGHT PROCESSING CERAMIC 3D PRINTING BASED ON THE SAME

CROSS REFERENCE TO RELATED APPLICATION

This patent application claims the benefit and priority of Chinese Patent Application No. 202110011236.5 filed on Jan. 5, 2021, the disclosure of which is incorporated by reference herein in its entirety as part of the present application.

TECHNICAL FIELD

The present disclosure relates to the field of 3D printing, in particular to a composite transparent film, a preparation method thereof and a method for continuous digital light processing ceramic 3D printing based on the same.

BACKGROUND ART

Ceramic materials have outstanding advantages such as high strength, high hardness, high temperature resistance, oxidation resistance, corrosion resistance, stable chemical properties and light weight. They are widely used in many fields such as aerospace, biomedicine, automobiles, electricity, energy, and national defense. However, the traditional ceramic molding technology is faced with deficiencies and limitations such as difficult processing (especially for complex shape structures), long manufacturing cycle, high manufacturing cost, etc., which restrict the wider application of ceramic parts. Compared with the traditional ceramic molding technology, 3D printing of ceramics has the following advantages: (1) No need for original green bodies and molds, short production cycle, and low manufacturing cost; (2) High manufacturing accuracy; (3) Realizing the forming of complex structures with almost any shape, and breaking through the constraints of geometric shapes in traditional manufacturing; (4) Suitability of personalized customization and single-piece small batch production; (5) Wide variety of molding materials, such as zirconia, alumina, tricalcium phosphate, silicon carbide, titanium carbide silicide, ceramic precursors, ceramic-based composite materials, etc. In addition, it has unique advantages in 3D printing of small parts, ceramic/metal composite materials and functionally graded materials, as well as material-structure-function integrated printing.

3D printing of ceramics currently has more than a dozen 3D molding processes according to the different ceramic materials used and the different uses. 3D printing of ceramics is mainly divided into stereolithography; selective laser sintering; ink-jet printing; three-dimensional printing (3DP); direct ink writing freeform fabrication; fused deposition molding; and laminated object manufacturing. Among which, stereolithography mainly includes point-by-point scanning light-curing and surface exposure light-curing, but they all face the problem of printing delamination, which not only affects the surface quality of molded parts, but also causes problems such as anisotropy of molded parts. Furthermore, the printing materials of light-curing 3D printing are mainly liquids, and there is a problem of filling the cured area with liquids. Especially in the surface exposure light-curing, for printing materials with too high viscosity, a squeegee must be added, which increases the molding time of the parts and the complexity of the printing device, thus greatly extending the overall printing time. Therefore, the existing light-curing ceramic 3D printing technologies still face the following challenging problems: low printing efficiency; anisotropy of molded parts caused by layer-by-layer printing, which leads to defects such as cracks and deformation in the subsequent sintering process, and seriously affects the quality and accuracy of the printed parts. There is an urgent need to develop a new process and technology.

The patent application CN201910090004.6 discloses a device for continuous surface exposure 3D printing of ceramics and a working method thereof, which uses a composite oxygen-enriched film to form a dead zone in the ceramic slurry, but the micro-pores in the PET porous membrane used in this composite oxygen-enriched film will seriously affect the light transmittance, thus leading to the decrease of the light source penetration and affecting the printing quality.

Therefore, there is an urgent need for a composite transparent film to improve the above problems and achieve a continuous ceramic 3D printing.

SUMMARY

In order to solve the above problems, the present disclosure provides a composite transparent film, a preparation method thereof and a method for continuous digital light processing ceramic 3D printing based on the same, which can enhance the strength of the composite transparent film and adapt to the printing of larger-mass slurries; and can extend the service life of the composite film, so that large-size and arbitrary-shaped molded parts can be printed continuously with low cost and high efficiency for various types of ceramic powders.

In order to achieve the above purpose, the present disclosure adopts the following technical schemes:

In some embodiments of the present disclosure, a method for preparing a composite transparent film for continuous digital light processing ceramic 3D printing is provided.

The steps are as follows:
(1) Taking a spherical $SiO_2$ particle with a particle size of about 200 nm and a premixed solution of Dow Corning PDMS, with a mass ratio of $SiO_2$ of 10%-40%, and stirring at 200 r/min-300 r/min for 2-5 min;
(2) Mixing the above mixed solution in an ultrasonic cleaning machine for 15-20 min;
(3) Adding a PDMS curing agent after standing and cooling, with the mass ratio of curing agent and premixed solution of PDMS of 1/10-1/8, and stirring at 200 r/min-300 r/min for 3-5 min;
(4) Standing for 12-24 h at a temperature of 0-8° C. until no bubbles;
(5) Using a CNC engraving machine to print the mixed solution into a film by baseboard heating at 80-100° C. under an air pressure of 30-50 kPa, and a speed of 320-400 mm/s;
(6) Drying the printed film in a drying oven;
(7) Immersing a fully cured $SiO_2$/PDMS composite film into a container filled with a $SiO_2$ suspension, wherein the particle size of $SiO_2$ in the suspension is 2-5 and pulling up vertically using a pulling machine at a uniform speed of 1-8 mm/s;
(8) Heating the resulting composite film at 200-250° C. for 60-80 h;
(9) Spin-coating a photoresist SU-8-based epoxy resin into a gap between $SiO_2$ particles on a surface of the composite film using a spin coater for 30-60 s at a rotation speed of 2500-3500 r/min, and then using an organic solvent to clean a remaining photoresist on the surface;

(10) Curing the photoresist on the surface using a UV curing lamp for 1-3 min;

(11) Etching the resulting composite film in a hydrofluoric acid solution for 5-15 min to remove $SiO_2$ on the surface, cleaning thoroughly with alcohol, and drying in the drying oven.

In some embodiments of the present disclosure, the concentration of the hydrofluoric acid solution in step (11) is preferably 2-5 vol %.

In some embodiments of the present disclosure, in step (6), the drying temperature is 80-100° C., and the drying time is 2-3 h; in step (11), the temperature of the drying oven is 60-80° C., and the drying time is 2-5 h.

In some embodiments of the present disclosure, the thickness of the finally obtained composite transparent film is 50-100 μm, the oxygen transmission efficiency is above 50 barrer, the ultraviolet light transmittance is not less than 80%, and the intensity is not less than 20 kPa.

In some embodiments of the present disclosure, the CNC engraving machine is Jingyan CNC3040 engraving machine; the ultrasonic cleaning machine is Goneng DL-3150 ultrasonic cleaning machine.

In some embodiments of the present disclosure, the device for continuous digital light processing ceramic 3D printing based on the composite transparent film includes a workbench and a base, and the workbench includes a printing platform, a storage tank, a composite transparent film, an oxygen supply cooling module, and a digital light module from top to bottom.

In some embodiments of the present disclosure, a method for continuous digital light processing ceramic 3D printing based on the composite transparent film, comprising the following steps:

(1) Pouring a prepared ceramic slurry into a storage tank;
(2) Controlling a bottom of printing platform at 20-30 μm above the composite transparent film, and making the slurry immerse the bottom of the platform;
(3) Introducing cooling oxygen;
(4) Turning on a light source to project a pre-processed image on the composite transparent film;
(5) After 10-15 s, controlling the printing platform to move upward at a constant speed of no more than 400 mm/h, and changing the projected image accordingly;
(6) After printing, turning off the light source, suspending the moving of printing platform, and stopping the introducing of cooling oxygen in sequence;
(7) Taking down a green body for printing ceramics and cleaning off a micro-cured slurry residue;
(8) Using a UV curing lamp to perform a secondary curing on the green body to finally obtain a required green body for printing ceramics;
(9) Sintering according to a corresponding sintering process to obtain a required ceramic.

In some embodiments of the present disclosure, the ceramic is selected from one or more of zirconia, aluminum oxide, silicon nitride, magnesium oxide, and yttrium oxide, the average particle size is 0.5-5 μm, and the powder shape is polygonal or spherical.

In some embodiments of the present disclosure, mixing the selected ceramic raw materials with a photosensitive resin, stirring manually at 200-300 r/min for 2-5 min, pouring into a ball mill, mixing at 300-450 r/min for 6-8 h, then placing the mixture in a drying oven and drying at room temperature for 60-90 min to obtain the required ceramic slurry.

Compared with the prior art, the beneficial effects of the present disclosure are as follows:

(1) Considering the strength, light transmittance, oxygen permeability, service life and other properties of the required composite film, the inventors creatively select a mixture of silica microspheres and PDMS to form a composite film on which silica is used to form a hydrophobic layer. Combined with specific optimized parameters, the film is more suitable for continuous digital light processing ceramic 3D printing.

(2) It can realize the continuous printing of ceramic slurries, solve the problem of delamination of printed pieces obtained by the existing 3D printing method of ceramics, and improve the printing accuracy.

(3) Mixing $SiO_2$ into PDMS can firstly improve the oxygen-enrichment performance of the original PDMS film without reducing the light transmittance, and secondly, it can improve the mechanical properties of the original PDMS film, and can be matched with a larger printing window to print large-volume products.

(4) Studies have found that the oxygen-enrichment performance of the composite film increases with the increase in the amount of $SiO_2$ added, so that the thickness of the "dead zone" generated during printing can be adjusted to a certain range, and finally it can produce a certain effect in matching the viscosity of the printing slurry.

(5) When printing, the upper part is the composite transparent film, and the lower part is the cooling oxygen, which can form a gas-solid contact surface; The oxygen supply cooling module can reduce the temperature of the area irradiated by the printing beam, which can reduce the aging speed of the composite film, reduce the cost, improve the efficiency, and can provide sufficient oxygen for printing.

(6) The hydrophobic layer on the composite film enhances the fluidity of the slurry on the composite film, i.e., the slurry filling speed during the printing is accelerated.

(7) The assembly cost is low. All devices use low-cost consumables, which greatly reduce the installed cost of the printing device.

BRIEF DESCRIPTION OF THE DRAWINGS

In order to explain the technical schemes in the embodiments of the present disclosure more clearly, the following will briefly introduce the drawings needed in the embodiments. Obviously, the drawings in the following description are some embodiments of the present disclosure. For the persons skilled in the art, without creative work, other drawings can be obtained based on these drawings.

Figure 1:
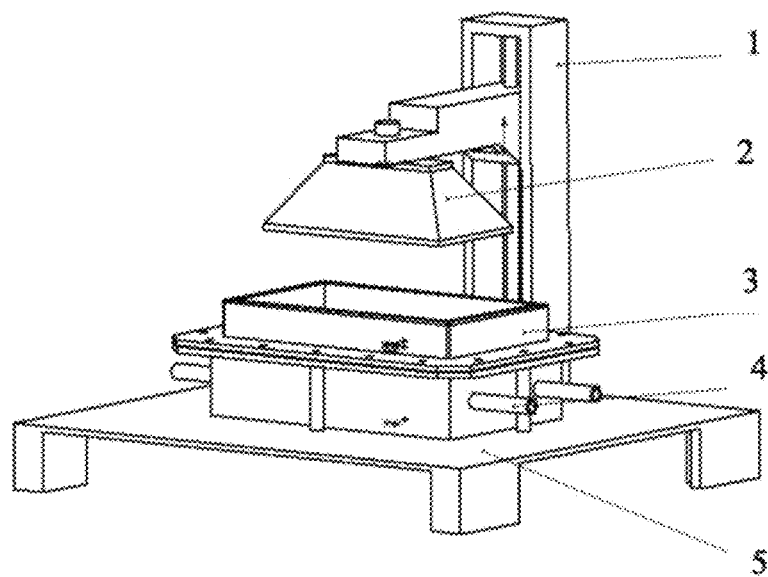
FIG. 1 is a perspective view of the printing device of the present application.
Figure 2:
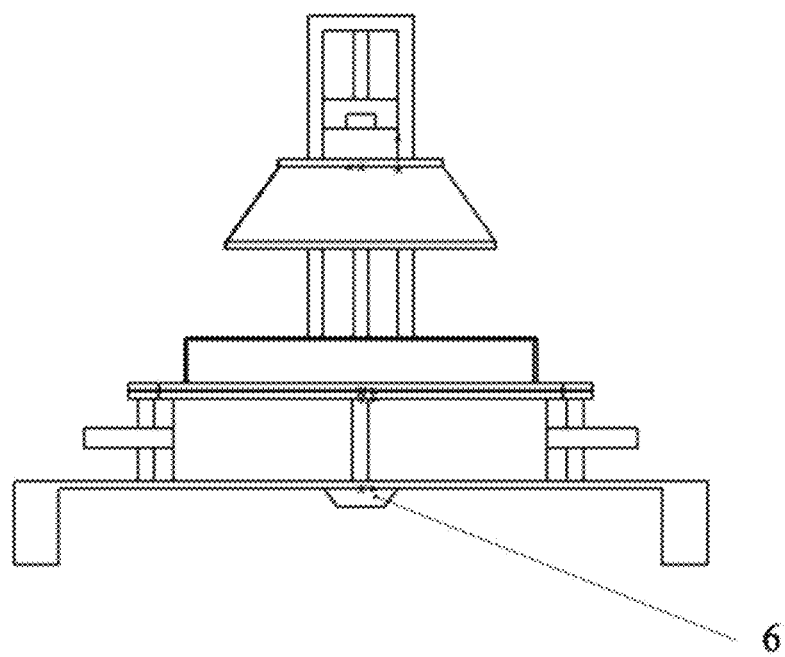
FIG. 2 is a front view of the printing device of the present application.
Figure 3:
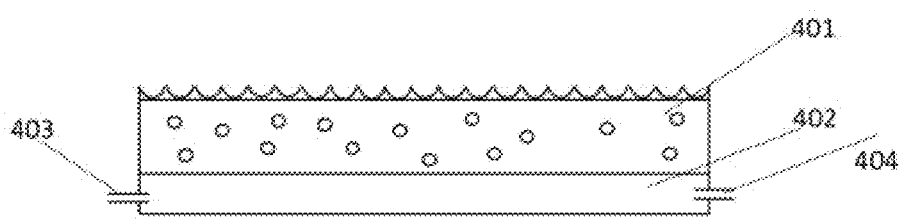
FIG. 3 is a schematic diagram of the composite transparent film and the oxygen supply cooling module of the present application.
Figure 4:
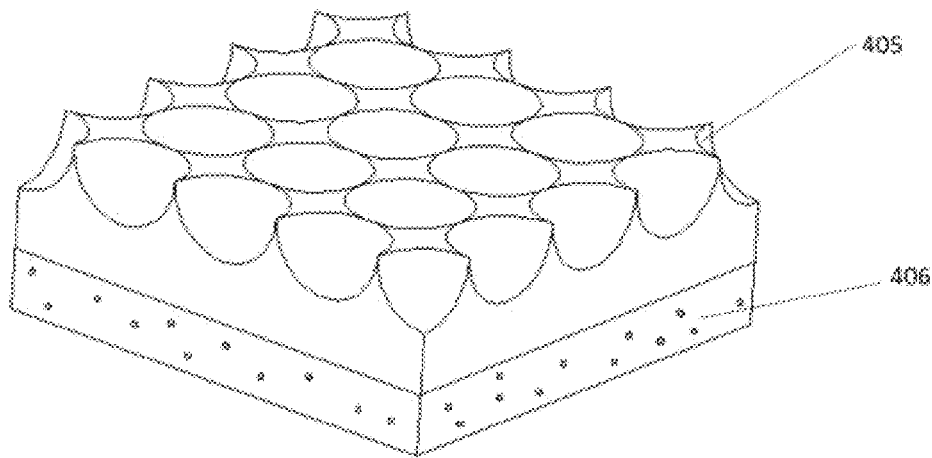
FIG. 4 is a schematic diagram of the structure of the composite transparent film of the present application.
Figure 5:
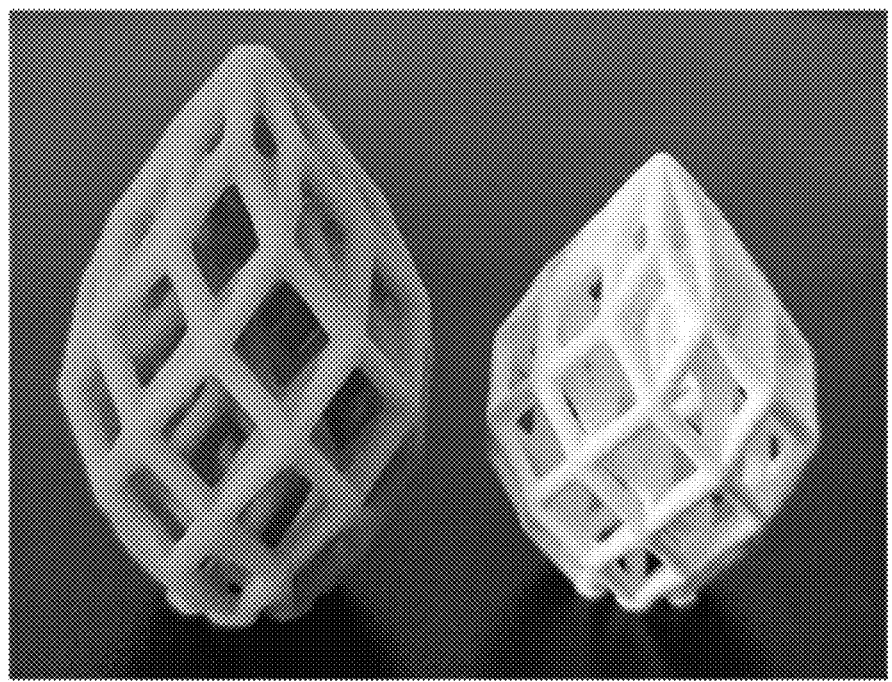
FIG. 5 shows the green body and sintered piece of the ceramic prepared in Example 2 of the present application.

Wherein, 1. Workbench; 2. Printing platform; 3. Storage tank; 4. Composite transparent film and oxygen supply cooling module; 5. Base; 6. Light source; 401. PDMS/SiO$_2$ composite film; 402. Multiple gas chamber; 403. Air inlet; 404. Air outlet; 405. PDMS film with SiO$_2$ etched away; 406. PDMS/SiO$_2$ film.

DETAILED DESCRIPTION OF THE EMBODIMENTS

The technical schemes in the embodiments of the present disclosure will be clearly and completely described below in conjunction with the accompanying drawings in the embodiments of the present disclosure. Obviously, the described embodiments are only a part of the embodiments of the present disclosure, rather than all the embodiments. Based on the embodiments of the present disclosure, all other embodiments obtained by the persons skilled in the art without creative work shall fall within the protection scope of the present disclosure. In the description of the present disclosure, it is to be understood that the orientation or positional relationship indicated by the terms "center", "upper", "lower", "front", "post", "left", "right", "vertical", "horizontal", "top", "bottom", "inside", "outside", etc. are based on the orientation or positional relationship shown in the drawings, which are only for the convenience of describing the present disclosure and simplifying the description, rather than indicating or implying that the device or element referred to must have a specific orientation, be constructed and operated in a specific orientation, and therefore cannot be understood as a limitation of the present disclosure.

In the description of the present disclosure, it is to be described in that, unless otherwise expressly specified and defined, the terms "mount", "connected", "connection" should be broadly understood, for example, may be a fixed connection, a detachable connection, or an integral connection. For the persons skilled in the art, the specific meaning of the above terms in the present disclosure can be understood in specific situations. In the description of the above embodiments, specific features, structures, materials, or characteristics may be combined in any one or more embodiments or examples. The terms "first" and "second" are only used for descriptive purposes, and cannot be understood as indicating or implying relative importance or implicitly indicating the number of technical features indicated. Thereby, the features defined with "first" and "second" may explicitly or implicitly include one or more of these features. In the description of the present disclosure, unless otherwise specified, "plurality" means two or more.

Example 1

(1) Spherical SiO$_2$ particles with a particle size of 200 nm and a premixed solution of Dow Corning PDMS were taken, the mass ratio of SiO$_2$ was 20%, and the mixture was stirred manually at 200 r/min for 2 min;
(2) The above mixed solution was mixed in Goneng DL-3150 ultrasonic cleaning machine for 15 min;
(3) The resulting mixed solution was left to stand and cooled, then a PDMS curing agent was added thereto, the mass ratio of curing agent and premixed solution of PDMS was 1/10, and stirred manually at 200 r/min for 3 min;
(4) The resulting mixture was left to stand for 24 h at a temperature of 4° C. until no bubbles;
(5) Using Jingyan CNC3040 engraving machine, the mixed solution was printed into a film by baseboard heating at 90° C. under an air pressure of 35 kPa, and a speed of 320 km/h;
(6) The printed film was dried in a drying oven;
(7) The fully cured SiO$_2$/PDMS composite film was immersed into a container filled with a SiO$_2$ suspension, wherein the particle size of SiO$_2$ was 3 μm, and the film was pulled up vertically using a pulling machine at a uniform speed of 2 mm/s;
(8) The above composite film was heated at 220° C. for 72 h;
(9) Photoresist SU-8-based epoxy resin was spin-coated into the gaps between SiO$_2$ particles on the surface of the composite film using a spin coater for 60 s at a rotation speed of 3000 r/min, and then the remaining photoresist on the surface was cleaned using ethyl acetate;
(10) The photoresist on the surface was cured using a UV curing lamp for 2 min;
(11) The above composite film was etched in a 2.5 vol % hydrofluoric acid solution for 10 min to remove SiO$_2$ on the surface, cleaned thoroughly with alcohol, and dried in a drying oven.

Finally, a composite transparent film with a thickness of 55 μm was obtained, the ultraviolet light transmittance is 85%, and it can support 100 ml of ZrO$_2$ ceramic slurry on the area of 100 cm$^2$ without deformation.

Example 2

(1) A 30 vol % ZrO$_2$ ceramic slurry was poured into the storage tank;
(2) The bottom of printing platform was controlled at 20 μm above the composite transparent film;
(3) Cooling oxygen was introduced;
(4) The light source was turned on to project the pre-processed image on the composite transparent film;
(5) After 10 s, the printing platform was controlled to move upward at a constant speed of 200 mm/h, and the projected image was changed accordingly;
(6) After printing, the light source was turned off, the printing platform was suspended to move, and the introducing of cooling oxygen was stopped in sequence;
(7) The green body for printing ceramics was taken down and the micro-cured slurry residue was cleaned off with alcohol;
(8) The green body was subjected to a secondary curing using a UV curing lamp to finally obtain a required green body for printing ceramics;
(9) The required green body was sintered according to a corresponding sintering process to obtain a required ceramic.

The above embodiments are only used to illustrate the technical schemes of the present disclosure, and without limitation thereto; although the present disclosure has been described in detail with reference to the foregoing embodiments, for the persons skilled in the art, it is still possible to modify the technical schemes described in the foregoing embodiments, or equivalently replace some of the technical features; and these modifications or replacements do not cause the essence of the corresponding technical schemes to deviate from the spirit and scope of the technical schemes claimed by the present disclosure.

What is claimed is:
1. A method for preparing a composite transparent film for continuous digital light processing ceramic 3D printing, the method comprising steps of:
(1) taking a spherical SiO$_2$ particle with a particle size of about 200 nm and a premixed solution of PDMS, with a mass ratio of SiO$_2$ of 10%-40%, and stirring at 200 r/min-300 r/min for 2-5 min;

(2) mixing a mixed solution of step (1) in an ultrasonic cleaning machine for 15-20 min;

(3) adding a PDMS curing agent after standing and cooling, with the mass ratio of curing agent and a premixed solution of PDMS of 1/10-1/8, and stirring at 200 r/min-300 r/min for 3-5 min;

(4) standing for 12-24 h at a temperature of 0-8° C. until no bubbles;

(5) using a CNC engraving machine to print the mixed solution of step (4) into a film by baseboard heating at 80-100° C. under an air pressure of 30-50 kPa, and a speed of 320-400 mm/s;

(6) drying the printed film in a drying oven;

(7) immersing a fully cured SiO$_2$/PDMS composite film into a container filled with a SiO$_2$ suspension, wherein the particle size of SiO$_2$ in the suspension is 2-5 μm, and pulling up vertically using a pulling machine at a uniform speed of 1-8 mm/s;

(8) heating the resulting composite film of step (7) at 200-250° C. for 60-80 h;

(9) spin-coating a photoresist SU-8-based epoxy resin into a gap between SiO$_2$ particles on a surface of the composite film using a spin coater for 30-60 s at a rotation speed of 2500-3500 r/min, and then using an organic solvent to clean a remaining photoresist on the surface;

(10) curing the photoresist on the surface using a UV curing lamp for 1-3 min; and

(11) etching the resulting composite film of step (10) in a hydrofluoric acid solution for 5-15 min to remove SiO$_2$ on the surface, cleaning thoroughly with alcohol, and drying in the drying oven.

2. The method for preparing the composite transparent film for continuous digital light processing ceramic 3D printing according to claim 1, wherein the concentration of the hydrofluoric acid solution in the step (11) is 2-5 vol %.

3. The method for preparing the composite transparent film for continuous digital light processing ceramic 3D printing according to claim 1, wherein;

in the step (6), the drying temperature is 80-100° C., and the drying time is 2-3 h; and in the step (11), the temperature of the drying oven is 60-80° C., and the drying time is 2-5 h.

4. A method for continuous digital light processing ceramic 3D printing using the composite transparent film prepared by the method according to claim 1, the composite transparent film having a thickness of 50-100 μm, an oxygen transmission efficiency of above 50 barrer, a ultraviolet light transmittance of not less than 80%, and an intensity of not less than 20 kPa; and the method for continuous digital light processing ceramic 3D printing comprising steps of:

(1) pouring a prepared ceramic slurry into a storage tank;

(2) controlling a bottom of printing platform at 20-30 μm above the composite transparent film, and making the slurry immerse the bottom of the platform;

(3) introducing cooling oxygen;

(4) turning on a light source to project a pre-processed image on the composite transparent film;

(5) after 10-15 s, controlling the printing platform to move upward at a constant speed of no more than 400 mm/h, and changing the projected image accordingly;

(6) after printing, turning off the light source, suspending the moving of printing platform, and stopping the introducing of cooling oxygen in sequence;

(7) taking down a green body for printing ceramics and cleaning off a micro-cured slurry residue;

(8) using a UV curing lamp to perform a secondary curing on the green body to finally obtain a required green body for printing ceramics; and (9) sintering according to a corresponding sintering process to obtain a required ceramic.

5. The method for continuous digital light processing ceramic 3D printing according to claim 4, wherein the ceramic is selected from one or more of zirconia, aluminum oxide, silicon nitride, magnesium oxide, and yttrium oxide.

6. The method for continuous digital light processing ceramic 3D printing according to claim 5, wherein the average particle size is 0.5-5 μm, and the powder shape is polygonal or spherical.

7. The method for continuous digital light processing ceramic 3D printing according to claim 4, wherein mixing the selected ceramic raw materials with a photosensitive resin, stirring manually at 200-300 r/min for 2-5 min, pouring into a ball mill, mixing at 300-450 r/min for 6-8 h, then placing the mixture in a drying oven and drying at room temperature for 60-90 min to obtain a required ceramic slurry.

8. The method for continuous digital light processing ceramic 3D printing according to claim 4, wherein a device used in the method includes a workbench and a base, and the workbench includes a printing platform, a storage tank, a composite transparent film, an oxygen supply cooling module, and a digital light module from top to bottom.

* * * * *